United States Patent [19]
Potma

[11] Patent Number: 5,608,581
[45] Date of Patent: Mar. 4, 1997

[54] REAR VIEW APPARATUS

[76] Inventor: Theodorus G. Potma, Irenelaan 17, 2159 LL Kaag, Netherlands

[21] Appl. No.: 211,970
[22] PCT Filed: Oct. 23, 1992
[86] PCT No.: PCT/NL92/00190
    § 371 Date: Jul. 28, 1994
    § 102(e) Date: Jul. 28, 1994
[87] PCT Pub. No.: WO93/08041
    PCT Pub. Date: Apr. 29, 1993

[30] Foreign Application Priority Data

Oct. 24, 1991 [NL] Netherlands ............ 9101784

[51] Int. Cl.$^6$ ............ G02B 5/08; G02B 5/10
[52] U.S. Cl. ............ 359/861; 359/866; 359/868
[58] Field of Search ............ 359/861, 633, 359/872, 851, 850, 858, 862, 863, 866, 846, 848, 847

[56] References Cited

U.S. PATENT DOCUMENTS

| 3,774,996 | 11/1973 | Donnelly | 359/861 |
| 3,806,233 | 4/1974 | Stefano | 359/851 |
| 3,827,788 | 8/1974 | Clark | 359/633 |
| 4,490,013 | 12/1984 | Pribis | 359/872 |
| 4,643,544 | 2/1987 | Loughram | 359/866 |

FOREIGN PATENT DOCUMENTS

| 2129220 | 12/1972 | Germany. | |
| 2408825 | 9/1974 | Germany. | |
| 3408984 | 9/1985 | Germany. | |
| 8518076 | 9/1985 | Germany. | |
| 355051636 | 4/1980 | Japan | 359/866 |
| 1534545 | 12/1978 | United Kingdom | 359/861 |

Primary Examiner—Paul M. Dzierzynski
Assistant Examiner—Mohammad Y Sikder
Attorney, Agent, or Firm—Ladas & Parry

[57] ABSTRACT

A rear view apparatus for a vehicle having at least a driver's cabin having a roof and a front window. The rear view apparatus having at least three mirror devices each of which is elongated and defining a longitudinal axis, a first mirror device of the apparatus being positioned higher than the roof; a third mirror of the apparatus being positioned in front of a driver in said cabin; and, a second mirror of the apparatus being positioned so as to direct light rays reflected from the first mirror device to the third mirror device, wherein the mirror surface of at least one of the three mirrors is torsioned in a longitudinal direction. The torsion of the mirror surface being opposed from the middle of the mirror surface to each of the sides of the mirror.

35 Claims, 3 Drawing Sheets 5,608,581

REAR VIEW APPARATUS

BACKGROUND OF THE INVENTION

1. Field of the Invention

The invention concerns a rear view apparatus for vehicles, especially passenger cars, and bears a resemblance to periscopic viewing apparatuses.

2. Description of the Prior Art

Periscopic rear view apparatuses in themselves are known. Use in passenger cars, however, has taken place hardly or not at all, because the known appartuses have drawbacks attached to them. These drawbacks concern, among other things, the restricted horizontal angle of vision of the known periscope, consisting of a tubular housing containing an optical apparatus by which an upright rear view image is obtained by means of mirrors and/or prisms and/or lenses.

A drawback of enlarging the angle of vision by using convex or cylindrical mirrors and the like is that image reduction takes place, whereby distances to the rear can no longer be properly estimated, which can pose a threat to road safety. Enlarging the angle of vision by strongly widening the periscope raises the drawback of increasing air resistance of the periscope which rises above the car roof, while the large dimensions also hinder the fitting and positioning of the periscope tube. Apart from this, the high costs of the known apparatuses are also a consideration.

SUMMARY OF THE INVENTION

The drawbacks mentioned are avoided or greatly reduced in the apparatus according to the invention, characterized in that the apparatus consists of at least three mirrors of which the first mirror is placed higher than the car roof with the mirror surface inclined towards the rear, the third mirror is placed in the driver's cabin in front of the head of the driver and with the mirror surface directed towards the driver and the second mirror is placed in such a way that the rays of light inciding from the rear reach the eye of the driver via the first mirror, subsequently via the second mirror and finally via the third mirror, wherein the cabin roof is provided with a transparent part through which passes the course of the rays between the first and the third mirror.

A second important characteristic of the apparatus according to the invention is that at least two of the mirror surfaces of the mirrors which are used are twisted. This torsion makes it possible to obtain such a field of vision that an optimal part of the total rearward field of view can be seen by the driver when the first mirror has a limited height. The optical image blurr which is caused by torsion of one of the mirror surfaces is corrected by an opposed torsion of the second and/or the third mirror. The torsion also allows for correction of the inclination of the image as well as the optical effect of a limited non-parallelism of the longitudinal axes of the mirror surfaces.

BRIEF DESCRIPTION OF THE DRAWINGS

The invention will be described and explained in more detail by means of the following figures.

DESCRIPTION OF THE PREFERRED EMBODIMENTS

Figure 1A:
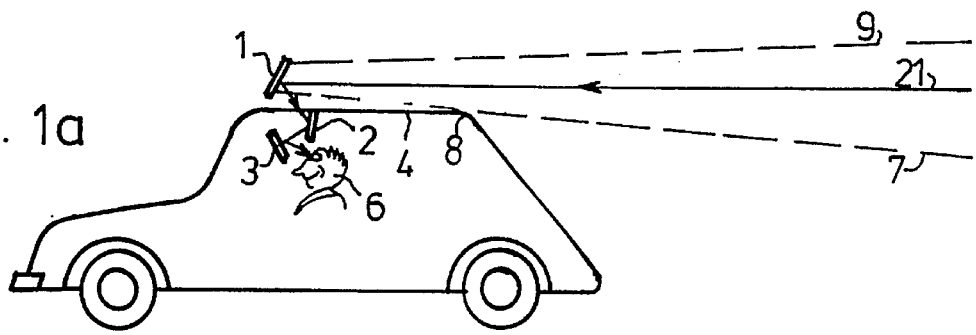
FIGS. 1a and 1b: illustrates the arrangement of the three mirrors.
Figure 1B:
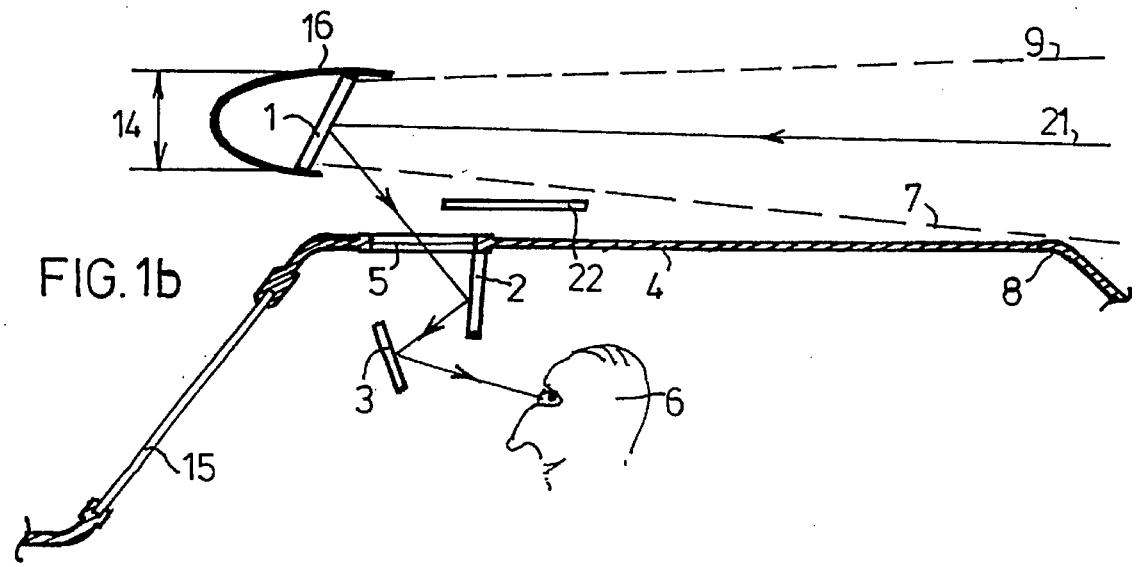

In FIG. 1, the first mirror (1) is secured higher than the car roof (4) as a separate mirror with the mirror surface directed backwardly and inclined downwardly. The second mirror surface (2) is secured immediately below the window (5) in the car roof, with the mirror surface directed towards the front. The third mirror (3) is situated in front of the head of the driver (6), with the mirror surface directed towards the driver. The course of the rays has been indicated in the figure (21). The figure shows that at its lower side, the bottom line of vision (7) is bordered by the rearside (8) of the car roof (4). The upper line of vision (9) has, for practical purposes, been restricted to such an extent that vision is possible upto a sufficient height above the road surface situated behind the car.

Figure 2A:
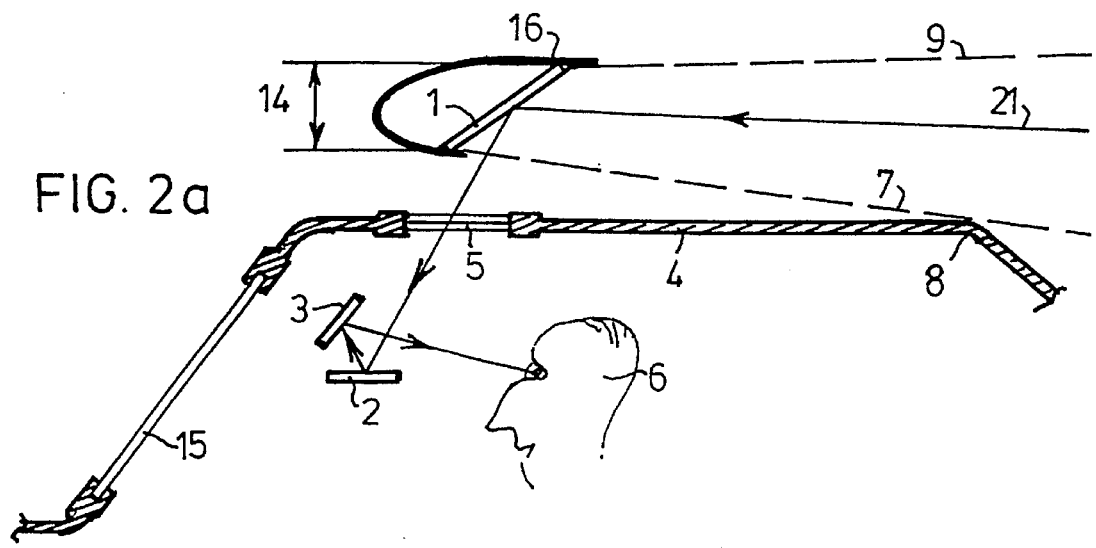
FIGS. 2a and 2b: shows a second possible arrangement of the three mirrors.

FIG. 2a shows an arrangment of the at least three mirrors wherein the second and the third mirror have been placed closely together, the mirror surface of the second mirror (2) has been directed upwardly and the second mirror (2) has been placed lower than the third mirror (3). This embodiment creates more space above the head of the driver but requires more space in front of the head of the driver.

Figure 2B:
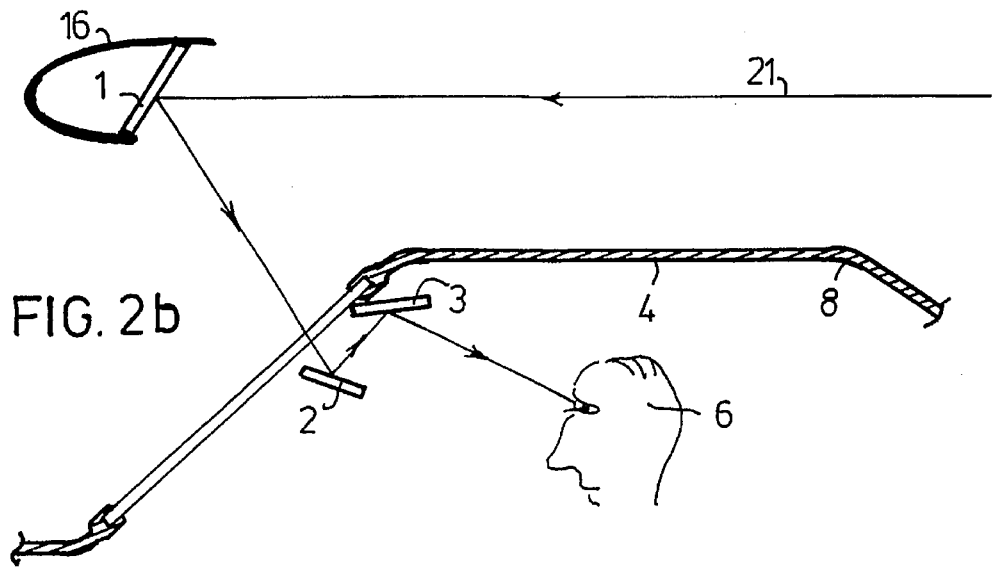

FIG. 2b indicates how the arrangement which has been described here allows for using the front window of the vehicle as the transparent part of the cabin wall. This utilisation of the front window is desirable when there is a relatively short distance between the head of the driver and the top side of the front window (15).

Figure 3:
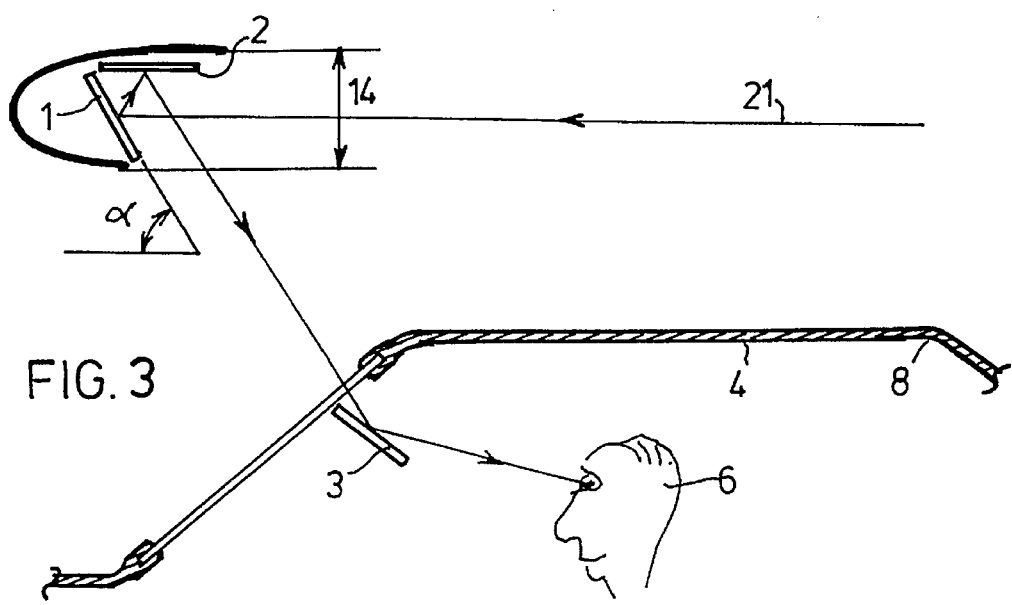
FIG. 3: shows a third arrangement of the three mirrors.

FIG. 3 shows an arrangement wherein the second mirror (2) has been placed higher than the first mirror (1), the mirror surface of the second mirror is directed downwardly and the mirror surface of the first mirror (1) is inclined and directed upwardly. The figure shows that this arrangement, too, can be employed in order to use the front window as the transparent part of the cabin wall through which pass the rays between the first and the third mirror. In this case, the mirror surface of the first mirror (1) defines an angle $\alpha$ with the horizontal. This angle $\alpha$ has a value of between 5° and 85°, but preferably of 60°, because in that case the height of the first mirror and the second mirror together can reach its minimum.

Figure 4:
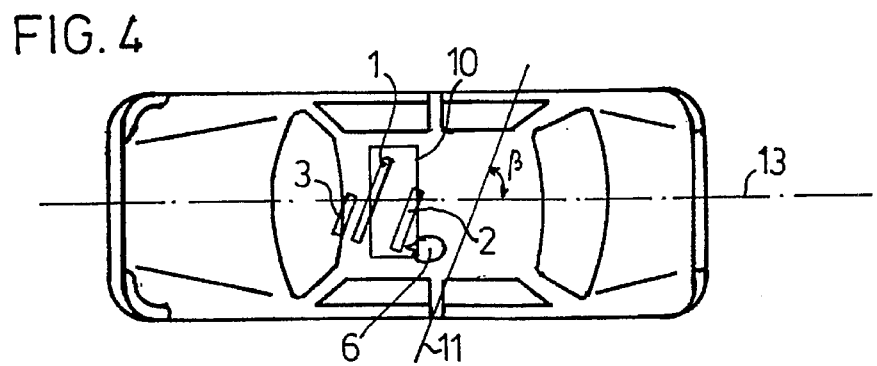
FIG. 4: shows how use can be made of a transparent sliding- or tilting roof which is already present.

FIG. 4 shows how an existing transparent sliding- or tilting roof (10) can be used. In view of the usual dimensions and positioning of such a roof, the rear view apparatus can only be applied in this case when at least one of the longitudinal axes of the mirrors is parallel to a horizontal line (11) which defines an angle ($\beta$) with the vertical (13) which splits the vehicle longitudinally. The angle ($\beta$) is between 90° and 50° and preferably 70°. In the preferred embodiment with parallel longitudinal axes, all longitudinal axes are parallel to said line (11). In the embodiment described here, all mirrors will be positioned on the side of the driver which faces the middle of the cabin.

Figure 5:
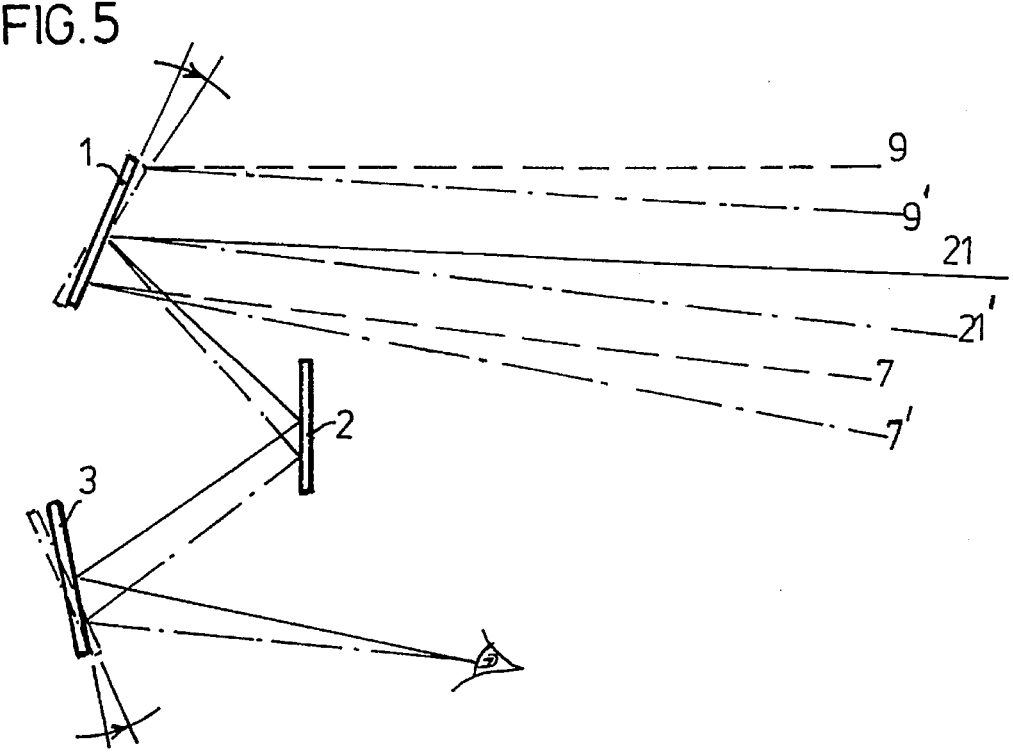
FIG. 5: illustrates the torsion of the mirrors and the effect thereof on the rearward field of vision.

FIG. 5 indicates how the lines of vision (7) and (9) can be twisted from the centre of the first mirror (1) to both sides in a downward direction to the position indicated by (7') en (9'). This twisting is obtained by twisting the mirror surface of the first mirror. The mirror surface of the first mirror is thereby rotated downwardly from the middle to both sides. This twisting of the field of vision is effective because, nearer the side of the field of vision, the edge of the car roof restricts the downward vision less. The downward twisting from (7) to (7') therefore provides an increased view of the road surface immediately behind and beside the car and thereby a better view of overtaking traffic which is near the car and diagonally behind it. At a given height (14) of the first mirror (1), the torsion of the mirror surface of the first mirror makes it possible to view a relatively larger part of the sides of the lower section of the rearward field of vision. Consequently, the first mirror can have a relatively lower height (14), whereby the air resistance of the first mirror (1) becomes as low as possible. In view of the importance of a low air resistance, the first mirror is also surrounded by an aero-dynamic hood (16) or a spoiler.

The image blurr which is a consequence of the twosided torsion of the mirror surface of the first mirror is compensated in the case drawn here by opposed twosided torsion of the mirror surface of the third mirror (3). By such a twosided and opossed torsion at the first and the third mirror, both an optimal field of vision and a relatively low height of the first mirror and a high picture-clarity can be achieved. A further improvement of the picture quality is achieved by increasing the degree of torsion (meant as angle rotation per unit of length of the mirror) from the centre of the mirrors to both sides. A gradual increase of the degree of torsion from the centre thereby causes the transition from left to right torsion in the centre of the mirrors to take place gradually as well, and does not lead to problematic image deformation in the centre.

Figure 6:
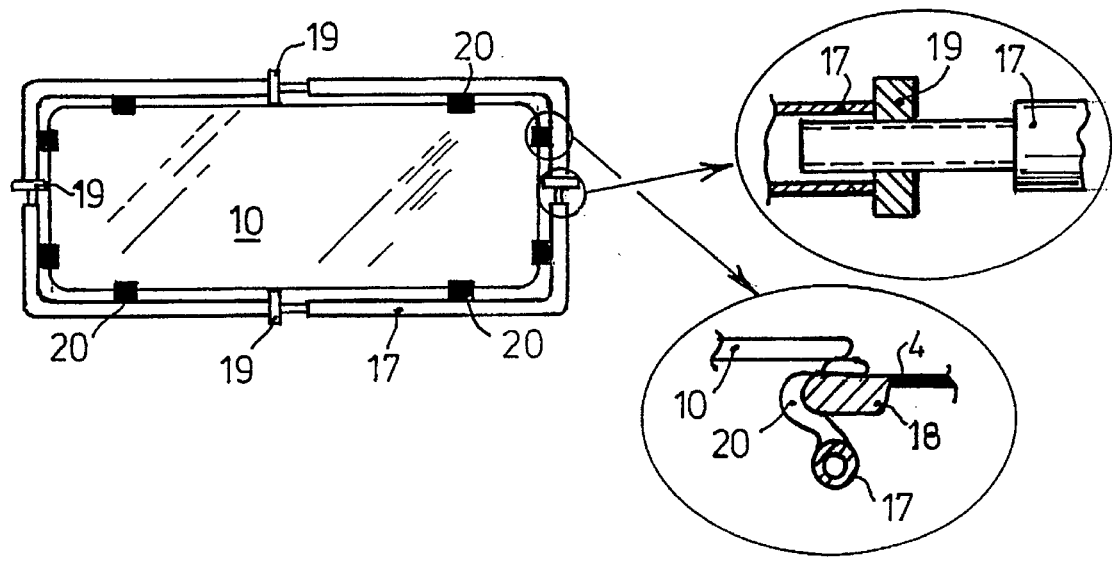
FIG. 6: shows some constructional details for the assembly of the mirrors.

FIG. 6 indicates how the rear view apparatus can be constructed in such a way that it can quickly be installed in cars which are already provided with a transparent sliding- or tilting roof. The mounting of the second and third mirror is done by clamping a frame (17) to the edge (18) of the roof opening, on which the mirrors (2) and (3) are slidably and/or rotatably secured. The frame can be enlarged or reduced longitudinally and/or cross-sectionally by means of a thread end and nut (19). Lips are secured to the frame (17), the shape of the lips corresponding to the shape of the edge of the roof opening (18). By enlarging the frame longitudinally and/or cross-sectionally, the lips (20) clamp against the edge of the roof opening. The frame offers ample opportunity for securing the mirrors. Instead of a frame round the roof opening, a smaller frame is also possible. The first mirror can be mounted higher than the roof by means of legs which are secured onto the roof such as the legs of a car roof rack. To allow for setting of the correct width, the legs should be slidably secured onto the mirror. When a fixed position on the car roof is concerned, it is desirable that the mirror can be swung down by means of pivots in the securing means.

In order to obtain the above-described torsion of the mirror surface, the mirror glass can be moulded into the desired shape when it is hot. It is, however, also possible to twist a flat glass mirror mechanically, for instance, by clamping at least one longitudinal side in a bent setting. In order to obtain a gradually increasing degree of torsion starting from the centre of the mirror, a circularly bent setting is then required on a longitudinal side in combination with a straight or circularly bent setting on the other longitudinal side. The intended gradually increasing torsion can also be obtained by bending the glass longitudinally over a cross support wherein a strip has been placed under the glass, the strip having such a section that a circular bendingline is formed on the one longitudinal side while the other longitudinal side is clamped in a straight position. The glass can also be clamped or glued onto a strip of metal or another form-retaining material which has previously been moulded into the desired shape.

The field of vision of the rear view apparatus according to the invention can be further increased by using convexly or cilyndrically curved mirror surfaces. An additional cylindrical curvature on the sides of the first mirror and a cylindrical curvature, with a horizontal cylinder axis, of the second mirror, is preferred.

It is also possible to superpose the described opposed torsion from the centre on a torsion which is constant over the length of the mirror, said latter torsion serving to compensate a certain inclination of the image.

In FIG. 1 a lightscreen (22) has been indicated above or on the outer top side of the car roof, preventing disturbing direct incidence of light on the third mirror.

It goes without saying that, when mention is made in the preceding paragraphs of the mirror surface or the mirror, this also refers to a mirror surface which is made up of several separate surfaces which, together, provide a reasonably continuous image.

The direction of the mirror surface here means the direction of the perpendicular line on the mirror surface. In relation to the indicated direction, a directional tolerance applies of plus and minus 40°. The directional indication "inclined" means a directional deviation of 45°.

I claim:

1. A rear view apparatus for a vehicle comprising at least a driver's cabin having a roof and a front window, said rear view apparatus comprising at least three mirror devices each of which is elongated and defining a longitudinal axis, a first mirror device of said apparatus being positioned higher than said roof; a third mirror of said apparatus being positioned in front of a driver in said cabin; and, a second mirror of said apparatus being positioned so as to direct light rays reflected from said first mirror device to said third mirror device, wherein the mirror surface of at least one of said three mirrors is torsioned in a longitudinal direction, said torsion of said mirror surface being opposed from the middle of said mirror surface to each of the sides of said mirror, as viewed in respective opposed longitudinal directions from said middle of said mirror.

2. The rear view apparatus according to claim 1, wherein the opposed torsion increases from the middle to the sides of the mirror in proportion to the distance from the middle.

3. The rear view apparatus according to claim 2, wherein the torsion is a composite torsion consisting of a first torsion which is constant over the length of the mirror, and a second torsion superimposed thereon and opposed from a middle of said mirror to said sides.

4. The rear view apparatus according to claim 2, wherein an opposed degree of torsion is obtained by clamping one or both longitudinal sides of said mirror glass in a circularly bent setting.

5. The rear view apparatus according to claim 2, wherein an opposed degree of torsion is obtained by securing or clamping one or both longitudinal sides of said mirror glass against a twisted strip of metal or other material.

6. The rear view apparatus according to claim 1, wherein the mirror surface of at least a further one of said at least three mirrors is torsioned in a manner so as to compensate for image blur resulting from the torsion of said at least one mirror.

7. The rear view apparatus according to claim 6, wherein said further one of said at least three mirrors is said third mirror.

8. The rear view apparatus according to claim 1, wherein torsion of a said mirror surface is obtained by mechanical deformation of flat mirror glass.

9. The rear view apparatus according to claim 1, wherein one or more of said mirror surfaces is curved in a convex, concave, cylindrical, or spherical manner.

10. The rear view apparatus according to claim 1, wherein the mirror surface of at least one of the mirrors is made up of several separate surfaces for providing a continuous image.

11. The rear view apparatus according to claim 1, wherein said third mirror is placed in said driver's cabin and wherein said first, second and third mirror devices are arranged in such a way that light rays are reflected from outside of the driver's cabin and enter the driver's cabin through said front window of said vehicle.

12. The rear view apparatus according to claim 11, wherein said second mirror device is placed above said first mirror device, wherein the mirror surface of the second mirror device is directed downward and the mirror surface of the first mirror is inclined rearward and upward.

13. The rear view apparatus according to claim 12, wherein the mirror surface of the first mirror defines an angle $\alpha$ of about 60° with a horizontal plane.

14. The rear view apparatus according to claim 12, wherein said first and second mirror devices are arranged in a mirror holder, such as a frame or hood, wherein the mirror surface of said second mirror device is positioned adjacent an approximately horizontally rearwardly extending portion of the mirror holder.

15. The rear view apparatus according to claim 11, wherein said second mirror device is arranged below said third mirror device and is provided with an upwardly inclined mirror surface.

16. The rear view apparatus according to claim 11, wherein each of said at least three mirror devices is elongated and defines a longitudinal axis in parallel with each other.

17. The rear view apparatus according to claim 1, wherein said at least one mirror having said torsioned surface is said first mirror.

18. A rear view apparatus for a vehicle comprising at least a driver's cabin having a roof and a front window, said rear view apparatus comprising at least three mirror devices each of which is elongated and defining a longitudinal axis, a first mirror device of said apparatus for being positioned higher than said roof; a third mirror of said apparatus being positioned in front of a driver in said cabin; and, a second mirror of said apparatus being positioned so as to direct light rays reflected from said first mirror device to said third mirror device, wherein the mirror surface of at least one of said three mirrors is torsioned in a longitudinal direction, said torsion of said mirror surface being opposed from the middle of said mirror surface to each of the sides of said mirror, as viewed in a longitudinal direction, said opposed torsion increasing from the middle to the sides of the mirror.

19. The rear view apparatus according to claim 18, wherein said opposed torsion increases from the middle to the sides of the mirror in proportion to the distance from the middle.

20. The rear view apparatus according to claim 19, wherein the torsion is a composite torsion consisting of a first torsion which is constant over the length of the mirror, and a second torsion superimposed thereon and opposed from a middle of said mirror to said sides.

21. The rear view apparatus according to claim 19, wherein an opposed degree of torsion is obtained by clamping one or both longitudinal sides of said mirror glass in a circularly bent setting.

22. The rear view apparatus according to claim 19, wherein an opposed degree of torsion is obtained by securing or clamping one or both longitudinal sides of said mirror glass against a twisted strip of metal or other material.

23. The rear view apparatus according to claim 18, wherein the mirror surface of at least a further one of said at least three mirrors is torsioned in a manner so as to compensate for image blur resulting from the torsion of said at least one mirror.

24. The rear view apparatus according to claim 23, wherein said further one of said at least three mirrors is said third mirror.

25. The rear view apparatus according to claim 18, wherein torsion of said mirror surface is obtained by mechanical deformation of flat mirror glass.

26. The rear view apparatus according to claim 18, wherein one or more of said mirror surfaces is curved in a convex, concave, cylindrical, or spherical manner.

27. The rear view apparatus according to claim 18, wherein the mirror surface of at least one of the mirrors is made up of several separate surfaces for providing a continuous image.

28. The rear view apparatus according to claim 18, wherein said third mirror is placed in said driver's cabin and wherein said first, second and third mirror devices are arranged in such a way that light rays are reflected from outside of the driver's cabin and enter the driver's cabin through said front window of said vehicle.

29. The rear view apparatus according to claim 28, wherein said second mirror device is placed above said first mirror device, wherein the mirror surface of the second mirror device is directed downward and the mirror surface of the first mirror is inclined rearward and upward.

30. The rear view apparatus according to claim 29, wherein the mirror surface of the first mirror defines an angle $\alpha$ of about 60° with a horizontal plane.

31. The rear view apparatus according to claim 29, wherein said first and second mirror devices are arranged in a mirror holder, such as a frame or hood, wherein the mirror surface of said second mirror device is positioned adjacent an approximately horizontally rearwardly extending portion of the mirror holder.

32. The rear view apparatus according to claim 28, wherein said second mirror device is arranged below said third mirror device and is provided with an upwardly inclined mirror surface.

33. The rear view apparatus according to claim 28, wherein each of said at least three mirror devices is elongated and defines a longitudinal axis in parallel with each other.

34. The rear view apparatus according to claim 18, wherein said at least one mirror having said torsioned surface is said first mirror.

35. The rear view apparatus according to claim 1, wherein each of said at least three mirror devices is elongated and defines a longitudinal axis in parallel with each other.

* * * * *